(12) United States Patent  (10) Patent No.: US 7,477,368 B2
Guthrie  (45) Date of Patent: Jan. 13, 2009

(54) RELAYED PUPIL OPTICAL CONTROL SYSTEM

(75) Inventor: Richard W. Guthrie, Moorpark, CA (US)

(73) Assignee: The Boeing Company, Chicago, IL (US)

( * ) Notice: Subject to any disclaimer, the term of this patent is extended or adjusted under 35 U.S.C. 154(b) by 448 days.

(21) Appl. No.: 11/219,138

(22) Filed: Sep. 2, 2005

(65) Prior Publication Data

US 2008/0002189 A1    Jan. 3, 2008

(51) Int. Cl.
*G01B 11/26* (2006.01)
*G01C 1/00* (2006.01)
*G01J 1/20* (2006.01)

(52) U.S. Cl. .............................. 356/139.08; 250/201.9; 250/201.1

(58) Field of Classification Search ............ 356/139.08, 356/139.01, 141.1, 4.01; 250/201.1, 203.1, 250/201.9, 203.6, 204
See application file for complete search history.

(56) References Cited

U.S. PATENT DOCUMENTS

| 4,559,445 | A | * | 12/1985 | Hedin et al. | ............. | 250/203.1 |
| 5,113,264 | A | * | 5/1992 | Isono et al. | ................. | 358/3.23 |
| 6,265,704 | B1 | * | 7/2001 | Livingston | ............... | 250/203.2 |
| 6,809,307 | B2 | * | 10/2004 | Byren et al. | ............. | 250/201.9 |
| 6,849,841 | B2 | * | 2/2005 | Byren et al. | ............. | 250/201.9 |
| 7,002,127 | B2 | * | 2/2006 | Billman | .................... | 250/201.9 |
| 7,041,953 | B2 | * | 5/2006 | Byren | ..................... | 250/201.9 |
| 7,158,867 | B2 | * | 1/2007 | Filep | ........................... | 701/23 |

* cited by examiner

*Primary Examiner*—L. G Lauchman
(74) *Attorney, Agent, or Firm*—Macpherson Kwok Chen & Heid LL; Norman Carte

(57) ABSTRACT

A plurality of pupil relays are configured to optically overlay a generally corresponding plurality of control points, so as to facilitate alignment of a laser beam with respect to a plurality of optical components, such as a system entrance pupil, a deformable mirror, a steering mirror, and a system exit pupil.

31 Claims, 4 Drawing Sheets

RELAYED PUPIL OPTICAL CONTROL SYSTEM

TECHNICAL FIELD

The present invention relates generally to high energy lasers and, more particularly, to a relayed pupil optical control system that substantially reduces the complexity and size of a beam control system for a tactical airborne laser.

BACKGROUND

Tactical airborne lasers can be effectively deployed against a wide variety of land based targets. For example, tactical airborne lasers can be used effectively against vehicles, supplies (such as petroleum, oil, and lubricant), aircraft (while on the ground), runways, airfield infrastructure (control towers, hangers, fuel tanks, etc.), buildings, troops, crew-served weapons and ships.

Tactical airborne lasers use a high energy laser (HEL) source. For a high energy laser to be effective, the tactical airborne laser system must utilize some form of beam-control. Beam control is necessary to keep the laser beam properly aligned upon the optics, to correct the wavefront of the beam, and to track targets that are off of the optical axis of the telescope, so that a well focused beam is provided to the target.

When a target is off-axis with respect to the telescope of a tactical airborne laser system, the laser beam can still be focused upon the target without moving the telescope. This is accomplished by instead moving steering mirrors that provide the laser beam to the primary mirror.

However, such contemporary approaches to using steering mirrors to maintain targeting tend to be complex. The can utilize a large number of parts, they can be heavy, and they can be bulky. For example, such contemporary systems require the use of a larger primary mirror. This is necessary to insure that the entire laser beam is incident upon the primary mirror and thus not wasted by missing the primary mirror. Further, as those skilled in the art will appreciate, the use of a larger primary mirror inherently introduces undesirable aberrations.

This use of more components, heavier components, and larger components limits the applicability of such tactical laser systems. This is particularly true in airborne/space applications where complexity, weight, and size are critical parameters.

Therefore, it is desirable to provide a high energy laser system that utilizes substantially simplified beam control, such that the high energy laser system is comparatively simple, lightweight, and small.

SUMMARY

Systems and methods are disclosed herein to provide for the alignment of optical components of a beam control system for a tactical airborne laser. For example, in accordance with an embodiment of the present invention, a beam control system comprises at least one of pupil relays that are configured to control beam translation optically.

More particularly, the beam control system comprises a plurality of pupil relays that are configured to optically overlay a plurality of control points so as to facilitate alignment of a beam from a high energy laser. The beam control system can comprise a plurality, e.g., two, of pupil relays that are at least partially defined by telescopes.

According to one embodiment of the present invention, the beam control system comprises only one deformable mirror and only one high power fast steering mirror. Thus, complexity, size, and weight of the beam control system of the present invention is substantially reduced with respect to that of contemporary beam control systems.

According to one aspect, the present invention comprises a beam control system. The beam control system comprises a plurality of pupil relays that are configured to control beam translation optically.

According to one aspect, the present invention comprises a beam control system and the beam control system comprises a plurality of pupil relays that are configured to optically overlay a plurality of control points, so as to facilitate alignment of a beam from a high energy laser.

According to one aspect, the present invention comprises a tactical laser. The tactical laser comprises a high energy laser and beam control optics comprising a plurality of pupil relays that are configured to optically overlay a plurality of control points so as to facilitate alignment of a beam from the high energy laser.

According to one aspect, the present invention comprises a tactical laser pod. The tactical laser pod comprises a pod or housing. A tactical laser is contained substantially within the pod. The tactical laser comprises a high energy laser and beam control optics. The beam control optics comprise a plurality of pupil relays that are configured to optically overlay a plurality of control points, so as to facilitate alignment of a beam from the high energy laser.

According to one aspect, the present invention comprises a method for controlling a beam of a tactical laser. The method comprises controlling beam translation optically with a plurality of pupil relays.

According to one aspect, the present invention comprises a method for controlling a beam of a tactical laser, wherein the method comprises using a plurality of pupil relays to optically overlay a plurality of control points so as to facilitate alignment of the beam.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Beam control is required in a tactical airborne laser system to correct the wavefront, such as for tilt and higher order phase distortions, and for directing the beam toward a target. Beam control is also necessary to maintain proper alignment of the beam with respect to the optical components of the tactical airborne laser system, i.e., to contain the beam properly within the beam train. For example, registration of the laser beam with respect to a wavefront sensor, a deformable mirror, and the primary higher order wavefront disturbance source (which can be the airflow just outside of a window), must be adequately maintained.

Contemporary airborne tactical laser systems maintain desirable alignment by utilizing a plurality of control mirrors. For example, a contemporary system may require four to six steering mirrors and two deformable mirrors. Even then, the system may suffer from deformable mirror-to-wavefront sensor misregistration. Such systems tend to be undesirably complex, heavy, and occupy a comparatively large volume. They can also be comparatively costly and less reliable (due to their larger number of components).

By way of contrast, at least one aspect of the present invention facilitates proper beam alignment by using pupil relays to optically overlay a plurality of control points. According to one embodiment, this is accomplished with a single steering mirror and a single deformable mirror.

At least one aspect of the present invention provides a way to eliminate the need to sense or control beam alignment directly, as is required by some contemporary methods. According to one embodiment of the present invention, beam translation is controlled optically. Thus, system complexity is reduced substantially, resulting in a high energy laser system that has fewer components, is lighter in weight, and is smaller in size than contemporary high energy laser systems.

System complexity is reduced by eliminating some of the active mirrors of contemporary beam control systems. These active mirrors are required by contemporary systems to control pointing of the laser beam within the high energy laser optics system. Elimination of the active mirrors substantially simplifies the tasks associated with maintaining the necessary optical registration between a deformable mirror, a system entrance pupil/aperture stop, and a wavefront sensor that provides the feedback signal for controlling the deformable mirror.

Figure 1:
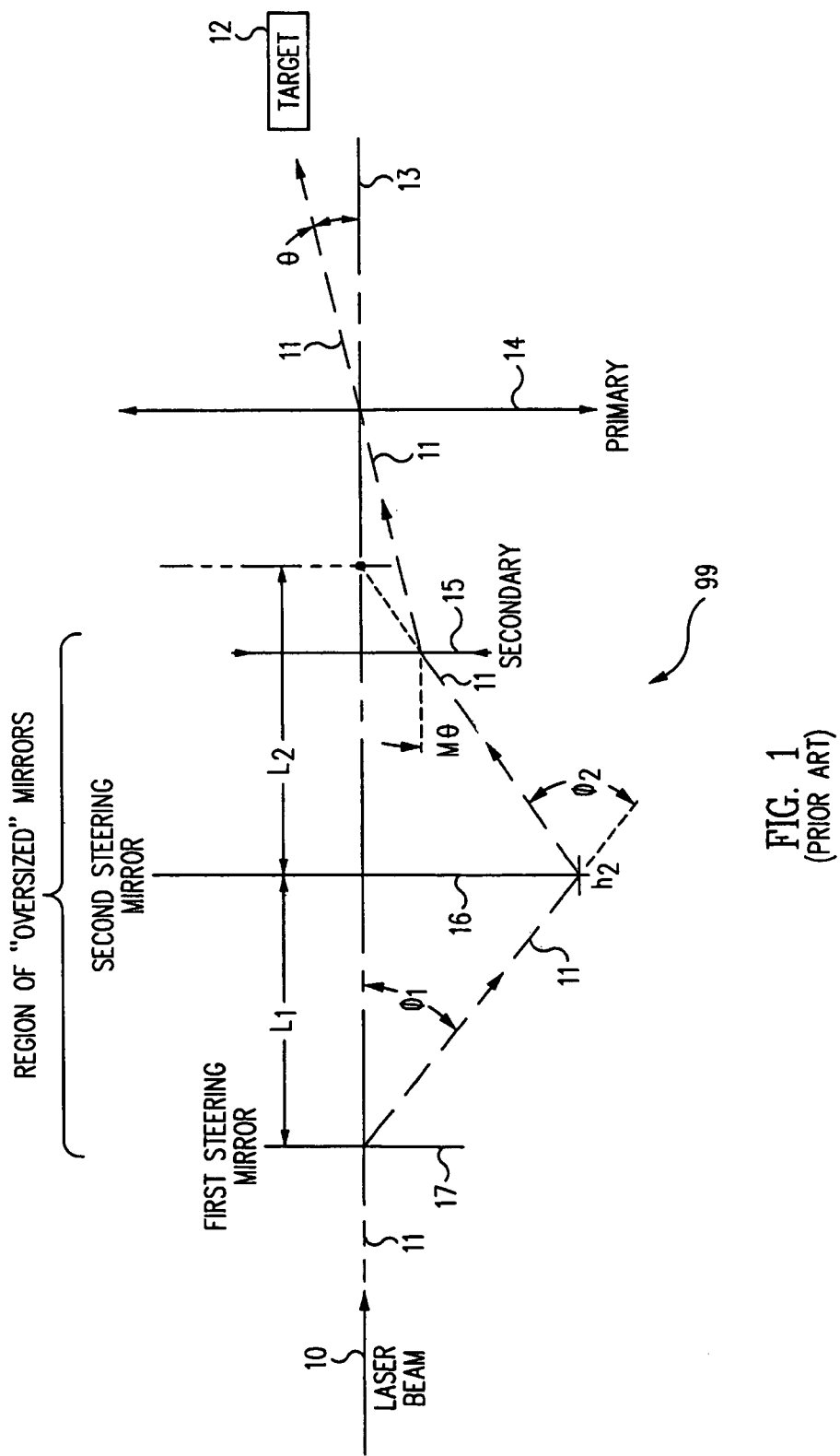
FIG. 1 is a block diagram that illustrates the effects of a first steering mirror, a second steering mirror, a secondary mirror, and a primary mirror upon the central ray of a laser beam of a tactical airborne laser when the laser beam is intentionally moved off axis with respect to the primary mirror and other optical elements, so as to be aimed at a target that is off axis with respect to the primary mirror, according to contemporary practice.

FIG. 1 is a block diagram illustrating an exemplary optical path of a central ray 11 of a laser beam 10 through the optics of a contemporary beam control system 99 of a tactical airborne laser when laser beam 10 is intentionally moved off axis so as to be aimed at a target 12 that is off axis with respect to a primary mirror 14. It is the optical axis 13 of a primary mirror 14 (as well as other components of the beam control system) with respect to which laser beam 10 (as represented by central ray 11) is off axis.

As those skilled in the art will appreciate, it is sometimes desirable to move a laser beam off axis with respect to the optical axis of primary mirror 14 so as to track and fire at a target that is off axis with respect thereto. That is, rather than re-aligning the primary mirror and/or other large optical components of the beam control system, a better solution is to steer the beam slightly off axis so as to maintain/provide desired pointing thereof at target 12.

According to contemporary practice, such steering is accomplished by a plurality of mirrors, such as first steering 17 and second steering mirror 16. However, the use of such a plurality of steering mirrors undesirably increases the complexity, weight, and size of the beam control system 99. This reduces the reliability of the airborne laser and limits the types of applications that the airborne laser is suitable for, while at the same time increasing the cost thereof.

More particularly, laser beam 10 from a high power laser (HEL) is directed to first steering mirror 17, which deflects laser beam 10, as indicated by central ray 11, by an angle $\phi_1$ so that central ray 11 travels to second steering mirror 16 which is disposed a distance $L_1$ from first steering mirror 17. From second steering mirror 16, laser beam 10 is reflected, by an angle $\phi_2$, to primary mirror 14, from which it is reflected toward target 12. First steering mirror 17 moves approximately ½ of angle $\phi_1$ to provide a deflection of angle $\phi_1$. Likewise second steering mirror 16 moves approximately ½ of angle $\phi_2$ to provide a deflection of angle $\phi_2$.

The angle $\phi_1$ is equal to $m\theta(L_1/L_2)$, where m is the magnification of first steering mirror 17, $\theta$ is the angle between optical axis 13 and a central ray aimed at target 12, $L_1$ is the distance between first steering mirror 17 and second steering mirror 16, $L_2$ is the distance between second steering mirror 16 and the point on the optical axis of the beam control system where central ray 11 would intersect the optical axis 13 if secondary mirror 15 was absent (which is one of the system's pupils).

Similarly, the angle $\phi_2$ is equal to $-m\theta(L_1+L_2)/L_2$, where m is the magnification of first steering mirror 17, $\theta$ is the angle between optical axis 13 and a central ray aimed at target 12, $L_1$ is the distance between first steering mirror 17 and second steering mirror 16, $L_2$ is the distance between second steering mirror and the point on the optical axis of the beam control system where central ray 11 would intersect the optical axis if secondary mirror 15 was absent (which is one of the system's pupils).

It is worthwhile to note that $L_1$ is typically much, much less than $L_2$. It is also worthwhile to note that $\phi_1$ and $\phi_2$ are much, much greater than me.

Because of the comparatively large angles, $\phi_1$ and $\phi_2$, at which light is reflected from first steering mirror 17 and second steering mirror 16, more mirror area around the central ray is required than would be the case if only smaller angles were encountered. This is true for primary mirror 14, as well. Such larger areas necessitate the use of larger mirrors, thus undesirably increasing the weight and size of beam control system 99.

Such larger angle deflections of laser beam 10 not only require the use of larger mirrors, but also require that more of the mirror's peripheral area be used. As those skilled in the art will appreciate, increased use of the peripheral area may sometimes undesirably increase beam distortion as more of the mirror's aberrations come into play.

Figure 2:
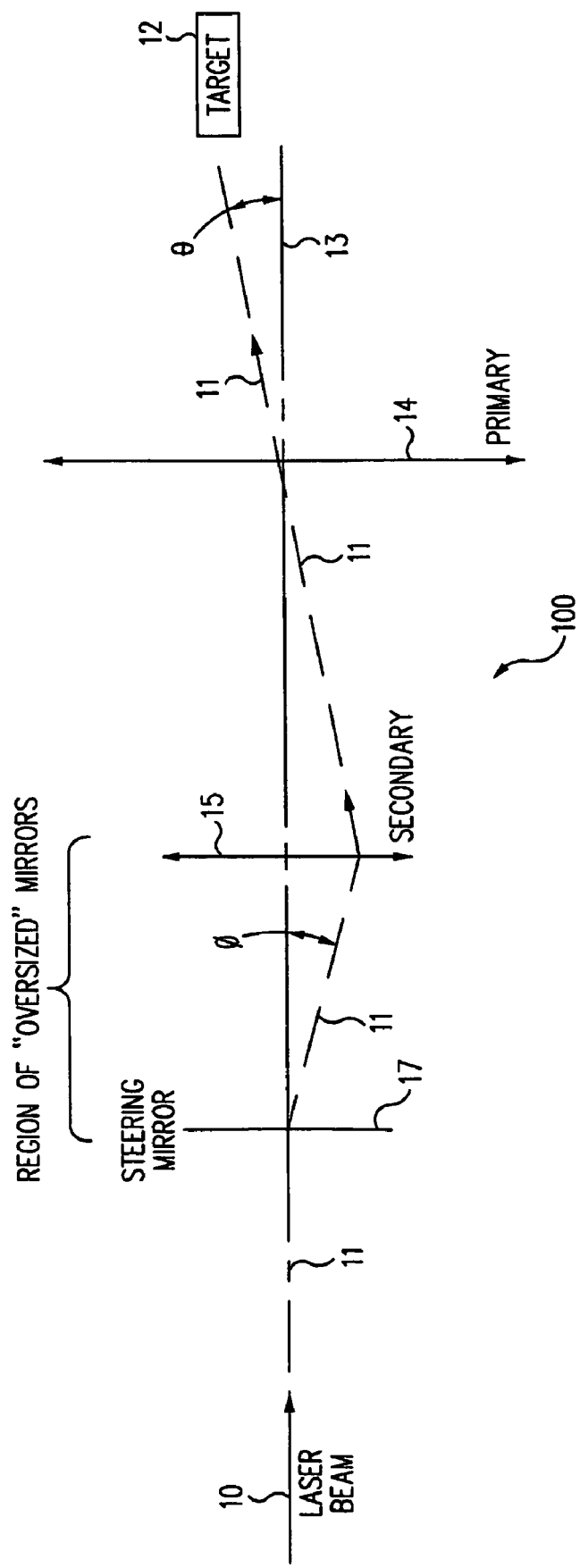
FIG. 2 is a block diagram that illustrates the effects of a single steering mirror, a secondary mirror, and a primary mirror upon the central ray of a laser beam of a tactical airborne laser when the laser beam is intentionally moved off axis with respect to the primary mirror and other optical elements, so as to be aimed at a target that is off axis with respect to the primary mirror, in accordance with an exemplary embodiment of the present invention.

FIG. 2 is a block diagram illustrating an exemplary optical path of a central ray 11 of a laser beam 10 through the optics of a beam control system of a tactical airborne laser according to an embodiment of the present invention. Those skilled in the art will appreciate that the present invention may likewise be used in non-airborne systems. Again, laser beam 10 is intentionally moved off axis so as to be aimed at a target 12 that is off axis with respect to the optical axis of primary mirror 14.

However, according to the embodiment of the present invention shown in FIG. 2, the second steering mirror is eliminated because there is no need for beam walk control.

In this instance, the angle φ is equal to me, where m is the magnification of first steering mirror 17, and θ is the angle between optical axis 13 and a central ray aimed at target 12. Steering mirror 17 moves approximately ½ of angle φ to provide a deflection of angle φ.

Use of the embodiment of the present invention shown in FIG. 2, rather than the contemporary configuration shown in FIG. 1, results in the use of a longer telescope, but a substantially shorter overall system length. Further, since smaller angles (such as angle φ) are required along the optical path to achieve a given angle θ, mirror and beam motion are reduced.

Also, the small angles facilitate the use of smaller mirrors. The use of smaller mirrors further reduces the weight and size of beam control system 100.

According to one embodiment of the present invention, the configuration of FIG. 2 can be achieved by moving a high power fast steering mirror (HPFSM) so that it provides the functionality of steering mirror 17 of FIG. 2. In this manner, laser beam 10 is directed to target 12 without moving it too far off axis with respect to the optics of beam control system 100. This is because relaying of the pupil makes the high power fast steering mirror appear to be like the primary mirror 14, as discussed in detail below.

Figure 3:
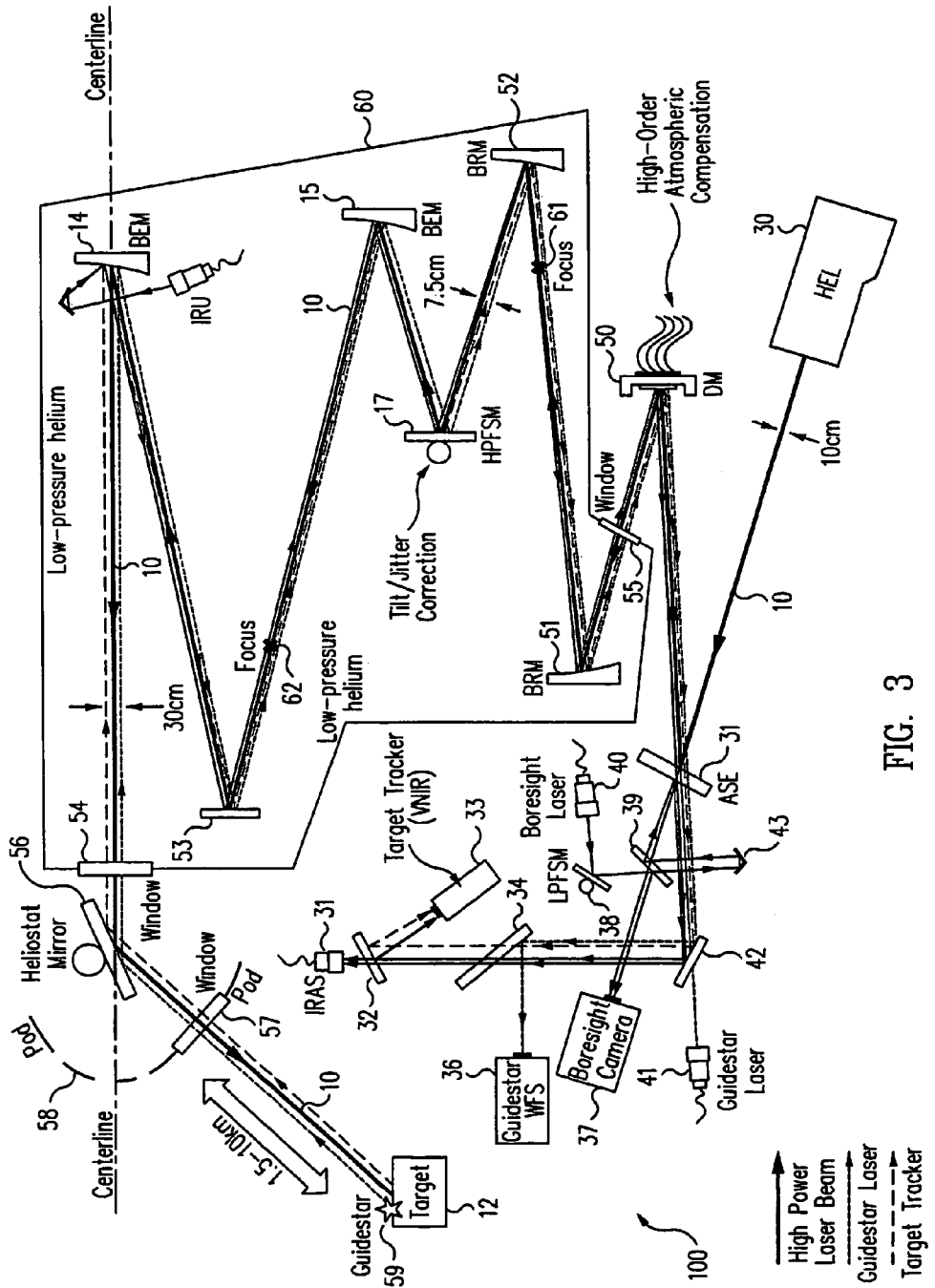
FIG. 3 is a diagram that schematically illustrates the layout of optical elements of a tactical airborne laser, in accordance with an exemplary embodiment of the present invention.

FIG. 3 shows, somewhat schematically, an exemplary layout of an embodiment of the present invention. A high energy laser 30 provides laser beam 10 to aperture sharing element (ASE) 31. High energy laser 30 can be any desired type of laser. In order to meet size and weight requirements, one or more high power diode lasers may be used. High power laser 30 can have an output beam of 10 centimeters, for example.

Aperture sharing element 31 facilitates sharing of beam control system 100 between high energy laser 30 and the target tracking, boresight and guidestar systems. The target tracking, boresight, and guidestar systems share some common optical elements. These systems comprise infrared alignment sensor (IRAS) 31, beam splitter 32, visible or near infrared (VNIR) target tracker 33, beam splitter 34, guidestar wavefront sensor 36, boresight 37, low power fast steering mirror (LPFSM) 38, guidestar laser 41, beam splitter 42, and angle reflector 43, which operate according to well known principles to facilitate target tracking, alignment, and atmospheric distortion compensation.

Aperture sharing element 31 reflects laser beam 10 to deformable mirror (DM) 50. Deformable mirror 50 modifies the wavefront of laser beam 10 to compensate for distortion therein and to pre-correct for distortions such as those that may be introduced by the optics of beam control system 100 and by the atmosphere (such as to provide high order atmospheric distortion compensation, for example).

Deformable mirror 50 directs laser beam 10 through window 55 to first beam reduction mirror 51. First beam reduction mirror 51 directs laser beam 10 to second beam reduction mirror 52. Second beam reduction mirror 52 directs laser beam 10 to high power fast steering mirror 17. Fast steering mirror 17 applies tilt correction to laser beam 10. Fast steering 17 mirror also tracks targets that are off axis.

First beam reduction mirror 51 thus cooperates with second beam reduction mirror 52 to reduce the diameter of laser beam 10 prior to laser beam 10 being incident upon high power fast steering mirror 17. For example, the diameter of laser beam 10 can be reduced from approximately 10.0 centimeters to approximately 7.5 centimeters. Such reduction in diameter of laser beam 10 facilitates the use of a smaller, lighter, and therefore faster, steering mirror. In reducing the diameter of laser beam 10, first focus 61 is formed.

High power fast steering mirror 17 defines the steering mirror 17 of FIG. 2, so as to reduce the angle φ by which laser beam 10 deviates from optical axis 13 of the beam control system optical components (such as when tracking an off axis target), as discussed below.

High power fast steering mirror 17 directs laser beam 10 to first beam expansion mirror 15. First beam expansion mirror 15 directs laser beam 10 via flat mirror 53 to second beam expansion mirror 14, which is also the primary mirror 14 of FIG. 2. Flat mirror 53 merely folds laser beam 10, so as to facilitate desired packaging of beam control system 100. Second beam expander mirror 14 directs laser beam 10 through second window 56 to heliostat mirror 56.

First beam expansion mirror 15 cooperates with second beam expansion mirror 14 to increase the diameter of laser beam 10 prior to laser beam 10 being incident upon heliostat mirror 56. For example, laser beam 10 can be expanded from approximately 7.5 centimeters in diameter to approximately 30 centimeters in diameter. Such expansion of laser beam 10 decreases the energy density thereof so as to make laser beam 10 more suitable for transmission through the atmosphere. In expanding the diameter of laser beam 10, second focus 62 is formed. First beam expansion mirror 15 defines secondary mirror 15 of FIG. 2.

Heliostat mirror 56 tends to maintain aiming of laser beam 10 toward target 12 as the aircraft upon which the airborne laser system is installed changes attitude or when the aircraft and target move with respect to each other. Heliostat mirror 56 can also be used to aim laser beam 10 for targeting. Heliostat mirror 56 thus directs laser beam 10 though exit window 57 of pod 58 toward target 12. The airborne laser system can be housed within pod 58 so that it can be attached to an aircraft, such as within the bomb bay or under the fuselage or wing thereof.

First beam reduction mirror 51 cooperates with second beam reduction mirror 52 to define a first telescope. Similarly, first beam expansion mirror 15 cooperates with second beam expansion mirror 14 to define a second telescope. The first telescope relays a pupil defined by deformable mirror 50 to high power fast steering mirror 17 and the second telescope relays a pupil defined by high power fast steering mirror 17 to the limiting aperture of the system, exit window 57. That is, the first telescope forms an image of deformable mirror 50 onto high power fast steering mirror 17 and the second telescope forms an image of high power fast steering mirror 17 (along with its image of deformable mirror 50) onto exit window 57. In this manner, angle φ is maintained at a comparatively low value.

Thus, according to at least one aspect of the present invention, telescopes are used to re-image, or relay, the source aperture (which can be considered to be deformable mirror 50 or which can alternatively be the output pupil of high energy laser 30) onto control elements such as steering mirrors and/or deformable mirrors of beam control system 100.

Deformable mirror 50 can be considered the source aperture since it is so close to high energy laser 30 and is thus likely to remain in alignment therewith. It is worthwhile to appreciate that the pupils can relay to or through a variety of different optical components, as desired. Relaying the pupils to exit window 57 tends to maximize alignment since this more closely provides an end-to-end alignment of the beam control system 100. Such relaying of the pupils is optically equivalent to having all of the relayed and target elements superimposed upon one another. When these elements are superimposed upon one another, the beam is necessarily registered upon these elements such that desired alignment is attained.

Further, it is worthwhile to appreciate that various other optical elements may be defined as the pupils to be relayed. Defining at least one pupil at or near high energy laser 30 tends to facilitate better end-to-end alignment of beam control system 100. Defining at least one pupil approximately midway through beam control system 100 tends to facilitate enhanced alignment thereof. However, such pupils can be defined at other points or at additional points, if desired.

Thus, according to one aspect of the present invention, beam control system 100 does not require explicit translation (beam walk) control because the pupil relays keep the beam near the optical centerline of beam control system 100. High power fast steering mirror 17 can both correct tilt errors and point the beam toward targets that are not directly on the optical centerline of primary mirror 14. In this manner, complexity of beam control system 100 is reduced substantially by the elimination of the second steering mirror, the sensor required so as to provide translation control feedback, the translation control processing equipment and the associated software. The size and weight of the beam control system are also reduced.

Thus, according to one aspect of the present invention, optical pupils are relayed though the beam control system. The placement and types of control elements, such as deformable mirrors and steering mirrors as well as sampling elements (such as the aperture sharing element), can be changed to reflect overall system requirements.

For example, the first control element could alternatively be a steering mirror rather than a deformable mirror. The steering mirror could be oriented such that the laser beam is incident upon it before the laser beam is incident upon the aperture sharing element. Such a configuration may not provide the same detailed wavefront control as the exemplary system described above, but it could correct for jitter from the high energy laser path. Other configurations are also possible, including the use of additional relays to increase the number of correctors or the placing of two or more correctors near the optical pupil locations. The latter approach trades a small, but acceptable, registration error for a reduced number of relays, thus resulting in a shorter overall system.

Containment 60 contains the first and second telescopes. An atmosphere of low-pressure gas, e.g., helium, can be maintained within containment 60 so as to mitigate the potentially adverse effects of having focuses 61 and 62 within beam control system 100. As those skilled in the art will appreciate, such focuses may otherwise generate sufficient heat in the ambient gases so as to distort laser beam 10 and/or have other adverse effects. Windows 54 and 55 allow light to enter and exit containment 55 while maintaining the desired atmosphere therein.

Figure 4:
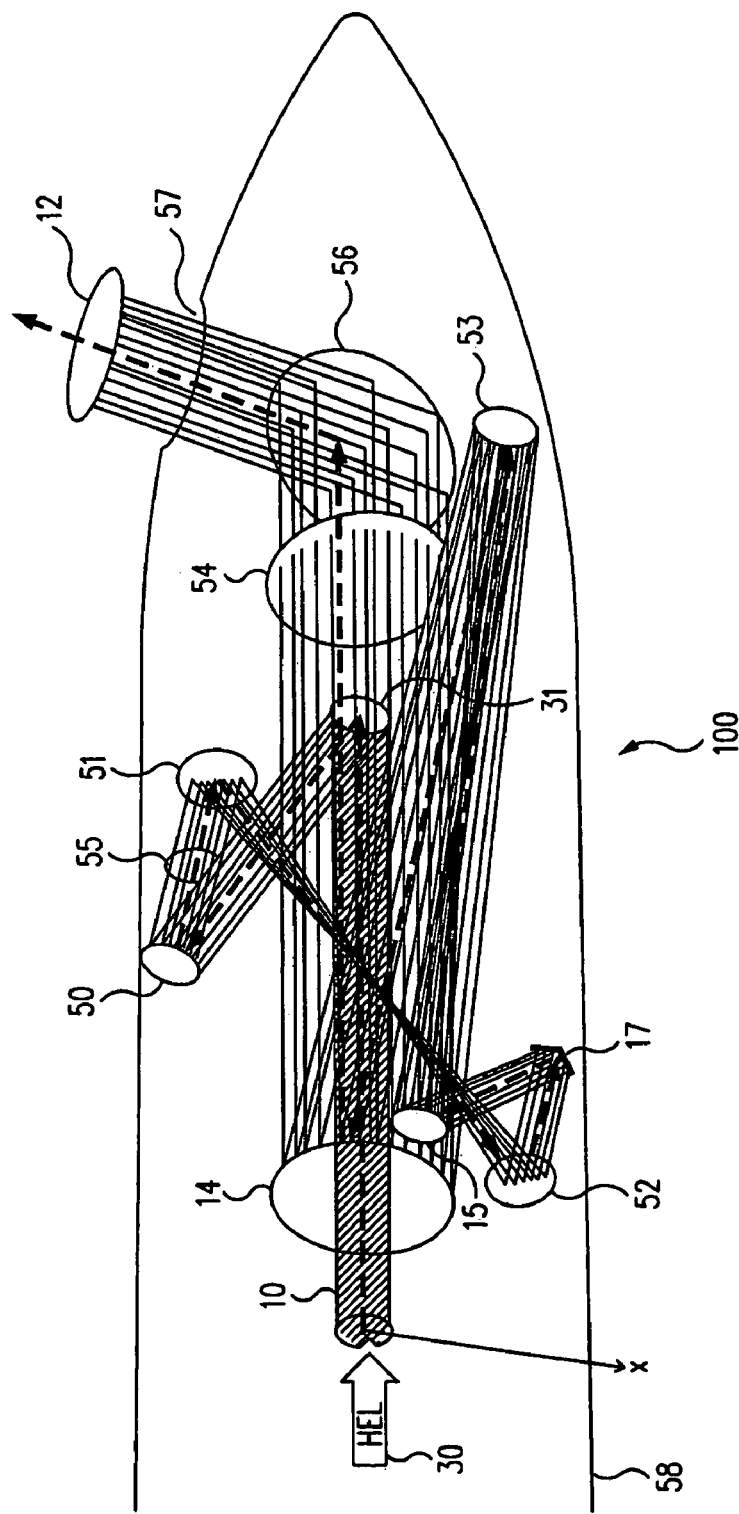
FIG. 4 is a block diagram that illustrates the layout of optical elements of a tactical airborne laser within a pod that can be attached to an aircraft, in accordance with an exemplary embodiment of the present invention.

FIG. 4 shows an exemplary placement of some of the key components of FIG. 3 within pod 58. Those skilled in the art will appreciate that other placements are likewise suitable.

Relays near the laser can be used to relay the laser's beam onto the pupils of this system. This extends use of the present invention to those cases in which the laser is not close to the deformable mirror and is therefore not substantially in alignment with the deformable mirror.

According to at least one aspect of the present invention, the complexity, size, and weight of a beam control system are reduced without compromising the beam control system's performance. Indeed, performance of the overall high energy laser system is enhanced.

Embodiments described above illustrate but do not limit the invention. It should also be understood that numerous modifications and variations are possible in accordance with the principles of the present invention. Accordingly, the scope of the invention is defined only by the following claims.

I claim:

1. A beam control system comprising:
   a plurality of pupil relays that are configured to optically overlay a plurality of control points so as to facilitate alignment of a beam from a high energy laser,
   wherein the control points comprise a deformable mirror and a steeling mirror, and
   wherein the beam is relayed from the high energy laser to the steering mirror via the deformable mirror.

2. The beam control system as recited in claim 1, wherein the plurality of pupil relays comprises two pupil relays.

3. The beam control system as recited in claim 1, wherein each pupil relay comprises a telescope.

4. The beam control system as recited in claim 1, wherein the steering mirror comprises a high power fast steeling mirror.

5. The beam control system as recited in claim 1, wherein an image of an entry pupil is relayed to an exit pupil.

6. The beam control system as recited in claim 1, wherein the image of the deformable mirror is relayed to an exit window via the steering minor.

7. The beam control system as recited in claim 1, wherein the image of the deformable mirror is relayed to an exit window via the steering mirror, and wherein the deformable mirror is disposed proximate to the high energy laser so as to remain substantially in alignment therewith.

8. The beam control system as recited in claim 1, wherein the beam control system comprises only a single steering mirror and only a single deformable miRRr.

9. The beam control system as recited in claim 1, wherein the plurality of pupil relays are configured to optically overlay a plurality of control points so as to facilitate alignment of the beam with respect to a deformable mirror, a system entrance pupil/aperture stop, and a wavefront sensor that provides the feedback signal for controlling the deformable miRRr.

10. A method for controlling a beam of a tactical laser, the method comprising:
    controlling beam translation using a plurality of pupil relays to optically overlay a plurality of control points so as to facilitate alignment of the beam,
    wherein the control points comprise a deformable mirror and a steering mirror, and
    wherein the beam is relayed from the tactical laser to the steering mirror via the deformable mirror.

11. The method as recited in claim 10, wherein using a plurality of pupil relays to optically overlay a plurality of control points comprises using two pupil relays to optically overlay a plurality of control points.

12. The method as recited in claim 10, wherein using a plurality of pupil relays to optically overlay a plurality of control points comprises using a plurality of telescopes to optically overlay a plurality of control points.

13. The method as recited in claim 10, wherein the steering mirror comprises a high power fast steeRing mirror.

14. The method as recited in claim 10, wherein using a plurality of pupil relays to optically overlay a plurality of control points comprises relaying an image of an entry pupil to an exit pupil.

15. The method as recited in claim 10, wherein using a plurality of pupil relays to optically overlay a plurality of control points comprises relaying an image of the deformable mirror to an exit window.

16. The method as recited in claim 10, wherein an image of the deformable mirror is relayed to an exit window, and wherein the deformable mirror is disposed proximate to the tactical laser so as to remain substantially in alignment therewith.

17. The method as recited in claim 10, wherein the plurality of pupil relays are configured to optically overlay a plurality of control points so as to facilitate alignment of the beam with respect to a deformable mirror, a system entrance pupil/aperture stop, and a wavefront sensor that provides the feedback signal for controlling the deformable minor.

18. A system comprising:
a high energy laser adapted to generate a beam; and
beam control optics having a plurality of pupil relays adapted to optically overlay a plurality of control points so as to facilitate alignment of the beam,
wherein the control points include a deformable mirror and a steering mirror, and
wherein the beam is relayed from the high energy laser to the steering mirror via the deformable mirror, and
wherein the beam is relayed from the deformable mirror to an exit window via the steering mirror.

19. The system as recited in claim 18, wherein the steering mirror comprises a high power fast steering mirror.

20. The system as recited in claim 18, wherein the plurality of pupil relays comprises a first pupil relay and a second pupil relay.

21. The system as recited in claim 20, wherein the first pupil relay comprises at least two beam reduction mirrors including a first beam reduction mirror adapted to cooperate with a second beam reduction mirror to define a first telescope.

22. The system as recited in claim 21, wherein the first telescope relays an image of the deformable mirror to the steering mirror.

23. The system as recited in claim 20, wherein the second pupil relay comprises at least two beam expansion mirrors including a first beam expansion mirror adapted to cooperate with a second beam expansion mirror to define a second telescope.

24. The system as recited in claim 23, wherein the second telescope relays an image of the steering mirror to the exit window.

25. The system as recited in claim 18, wherein the deformable mirror is disposed proximate to the high energy laser to thereby remain substantially in alignment therewith.

26. The system as recited in claim 18, further comprising a pod, wherein the high energy laser and the beam control optics are positioned substantially within the pod.

27. The system as recited in claim 1, wherein the plurality of pupil relays comprises a first pupil relay and a second pupil relay.

28. The system as recited in claim 27, wherein the first pupil relay comprises at least two beam reduction mirrors including a first beam reduction mirror adapted to cooperate with a second beam reduction mirror to define a first telescope.

29. The system as recited in claim 28, wherein the first telescope relays the beam from the deformable mirror to the steering mirror.

30. The system as recited in claim 27, wherein the second pupil relay comprises at least two beam expansion mirrors including a first beam expansion mirror adapted to cooperate with a second beam expansion mirror to define a second telescope.

31. The system as recited in claim 30, wherein the second telescope relays the beam from the steering mirror to an exit window.

* * * * *